(12) United States Patent
Butz et al.

(10) Patent No.: US 10,082,186 B2
(45) Date of Patent: Sep. 25, 2018

(54) BRAKE LINING AND BRAKE LINING RETENTION DEVICE OF A DISC BRAKE

(71) Applicant: MAN Truck & Bus AG, München (DE)

(72) Inventors: Matthias Butz, München (DE); Florian Orgler, München (DE)

(73) Assignee: MAN TRUCK & BUS AG, München (DE)

( * ) Notice: Subject to any disclaimer, the term of this patent is extended or adjusted under 35 U.S.C. 154(b) by 0 days.

(21) Appl. No.: 15/424,391

(22) Filed: Feb. 3, 2017

(65) Prior Publication Data
US 2017/0227076 A1 Aug. 10, 2017

(30) Foreign Application Priority Data
Feb. 5, 2016 (DE) .......................... 10 2016 001 321

(51) Int. Cl.
*F16D 65/097* (2006.01)
*F16D 65/095* (2006.01)
(Continued)

(52) U.S. Cl.
CPC ......... *F16D 65/0976* (2013.01); *F16D 55/02* (2013.01); *F16D 65/0006* (2013.01);
(Continued)

(58) Field of Classification Search
CPC ............. F16D 65/0006; F16D 65/0976; F16D 65/0977; F16D 55/02; F16D 65/095; F16D 65/40; F16D 2069/005; F16D 69/0408
(Continued)

(56) References Cited

U.S. PATENT DOCUMENTS 3,712,423 A * 1/1973 Girauldon ........... F16D 65/0976
188/73.38
3,885,651 A 5/1975 Odier
(Continued)

FOREIGN PATENT DOCUMENTS

| DE | 2204047 A1 | 8/1973 |
| DE | 3434421 A1 | 4/1985 |

(Continued)

OTHER PUBLICATIONS

Extended European search report issued in corresponding application No. 17151576.0 dated Jul. 12, 2017.
(Continued)

*Primary Examiner* — Thomas W Irvin
(74) *Attorney, Agent, or Firm* — Carter, Deluca, Farrell & Schmidt, LLP

(57) ABSTRACT

A brake lining retention device for a disc brake of a motor vehicle. The brake lining retention device includes a brake carrier fixed at the vehicle side and having a lining shaft for receiving a brake lining, wherein the lining shaft is delimited at the brake disc leading side in relation to a main rotation direction of the brake disc and delimited at the brake disc trailing side by a lining horn-like member of the brake carrier. The brake lining retention device includes a brake lining guided in the lining shaft and has a lining retention member and a friction lining fixed thereto, and a resilient element supported on a lining horn-like member and a support face of the lining retention member, wherein the face is adjacent to the lining horn-like member and the resilient element is inserted in a recess of the lining retention member.

14 Claims, 4 Drawing Sheets

(51) Int. Cl.
*F16D 69/04* (2006.01)
*F16D 65/40* (2006.01)
*F16D 55/02* (2006.01)
*F16D 65/00* (2006.01)
*F16D 69/00* (2006.01)

(52) U.S. Cl.
CPC .......... *F16D 65/095* (2013.01); *F16D 65/40* (2013.01); *F16D 69/0408* (2013.01); *F16D 2069/005* (2013.01)

(58) Field of Classification Search
USPC ....................................................... 188/73.38
See application file for complete search history.

(56) References Cited

U.S. PATENT DOCUMENTS

| | | | | |
|---|---|---|---|---|
| 4,469,205 A * | 9/1984 | Stoka | .................. | F16D 65/0978 188/234 |
| 4,629,037 A | 12/1986 | Madzgalla et al. | | |
| 4,993,520 A * | 2/1991 | Goddard | ................ | F16D 65/092 188/250 B |
| 8,496,093 B2 * | 7/2013 | Kreuzeder | .......... | F16D 65/0976 188/1.11 L |
| 2003/0010582 A1 * | 1/2003 | Denton | ................ | F16D 65/0974 188/73.38 |
| 2007/0261927 A1 | 11/2007 | Iraschko et al. | | |

FOREIGN PATENT DOCUMENTS

| | | |
|---|---|---|
| DE | 102004053026 A1 | 5/2006 |
| DE | 102010019470 A1 | 11/2011 |
| DE | 102012002734 A1 | 8/2013 |
| DE | 102012006135 A1 | 9/2013 |
| DE | 102012024945 A1 | 6/2014 |
| EP | 2644926 A1 | 10/2013 |
| JP | 2006-90392 A | 4/2006 |

OTHER PUBLICATIONS

German search report issued in corresponding application No. 102016001321.4 dated Jan. 13, 2017.

* cited by examiner

PRIOR ART

BRAKE LINING AND BRAKE LINING RETENTION DEVICE OF A DISC BRAKE

BACKGROUND

1. Technical Field

The present disclosure relates to a brake lining and a brake lining retention device of a disc brake of a motor vehicle.

2. Description of Related Art

In the field of wheel brakes, the subject of undesirable noise production assumes great significance. In addition to friction-induced vibrations, such as, for example, squealing, however, there are also produced other noises which can be attributed to occurrences of roadway unevenness or brake actuation operations.

For example, floating calliper brakes are used in the utility vehicle sector. In this instance, in order to support the high braking torques which occur, the brake linings are supported by so-called lining horn-like members in an axially fixed brake carrier in both rotation directions of the brake disc. The floatingly supported brake calliper then produces only the brake application force with which the brake linings are pressed against the brake disc. So that the brake linings can be moved in a free-running manner in the lining shaft, the brake linings and brake lining shaft are processed with a specific tolerance position relative to each other. In this case, the lining horn-like members of the brake carrier are produced parallel with each other in the normal state. Occurrences of play of different magnitudes can thereby be produced. During manual assembly of the brake carrier (for example, after changing brake discs), however, it is possible for the lining shaft shape of the brake carrier to become deformed by the screw tightening torque in such a manner that the play at the tip of the lining horn-like members becomes further increased. During vehicle operation, the brake lining abuts, as a result of gravitational force in accordance with the installation position of the brake calliper, the lining horn-like member which leads with respect to the brake disc (so-called "9 o'clock installation position"), the lining horn-like member which trails with respect to the brake disc (so-called "3 o-clock installation position") or in an undefined manner (so-called "12 o-clock installation position").

However, a brake torque can be supported only when the brake lining abuts the lining horn-like member which trails with respect to the brake disc. Should the brake lining abut the horn-like member which leads with respect to the brake disc as a result of gravitational force, it must first overcome the entire play which has been formed by the production tolerances and brake carrier deformation. During this time, however, the brake lining picks up speed as a result of the brake disc rotation before it strikes the lining horn-like member at the trailing side and brake torque can be transmitted. Therefore, this results in a delayed response of the brake and an undesirable noise formation. When the brake is released, the brake lining then falls back onto the lining horn-like member at the leading side, which again results in an impact noise.

FIG. 4 is a lateral top cross-sectional view of a brake lining which is retained in a brake carrier 2 according to the prior art, of which only the brake lining carrier plate (also referred to as the lining carrier plate below for brevity) 41 can be seen in the sectional view of FIG. 4. In this known brake lining retention device 40, the brake carrier 2 is constructed with respective lining horn-like members 3, 4 which are located at the leading side and trailing side and which support the lining carrier plate 41. The lining horn-like members 3 and 4 and the bridge portion 7 which connects them form the lining shaft in which the brake lining is guided with play (see gap 42).

In order to assemble or disassemble the lining carrier plate 41, it is inserted perpendicularly into the gap between the two lining horn-like members 3, 4, wherein the lining horn-like members 3, 4 extend as far as the radially external edge or practically as far as the edge of the brake lining carrier plate 41. In this case, both the inner faces 5, 6 of the lining horn-like members 3, 4 and the adjacent support faces 46 of the lining carrier plate 41 are constructed as planar faces. In this case, the rear carrier horn-like member in a main rotation direction MRD of the brake disc, that is to say, the rotation direction of the brake disc during forward travel of the motor vehicle, is referred to as the leading-side carrier horn-like member 3. It is further possible to see a gap 42 between the leading-side support face 46 of the lining carrier plate 41 and the leading-side lining horn-like member 3, as a result of which the play and the above-described impact noises are produced. In order to prevent such effects, various solutions are known according to the prior art.

U.S. Pat. No. 3,885,651 discloses the arrangement of a separate lining shaft spring between the brake lining and the carrier. A disadvantage therein is that the lining shaft spring is compressed during a braking operation in the reverse direction in such a manner that a plastic deformation cannot be excluded. In this case, a subsequent correct function of the lining shaft spring would no longer be ensured.

However, the Published German Patent Application DE 10 2012 002 734 A1 proposes the arrangement of a resilient element on the base of the lining shaft, which resilient element presses the brake lining radially against round guide faces. The construction proposed in DE 10 2012 002 734 A1 cannot be implemented with standard lining shafts and prevents normal insertion of the brake linings in a radial direction. In order to change the linings, they first have to be moved after complete resetting of the pressure pieces in the direction towards the brake disc until they have completely left the lining shaft in this direction. Only then is it possible to remove them in a radial direction. However, this means a greater operating complexity, particularly if the brake linings are intended only to be inspected but not changed.

SUMMARY

One aspect of the present disclosure is to provide an improved brake lining retention device and an improved brake lining of a disc brake, with which disadvantages of conventional devices can be prevented. An object of the present disclosure is in particular to provide a brake lining which functions with conventional lining shaft construction types, as illustrated in FIG. 4, and/or which can also be introduced into provided floating calliper brakes only as required. In this case, the construction is intended to prevent the lining from striking in a delayed manner in at least one main travel direction and from resulting in damage to the construction at least in the other travel direction, and consequently allows reliable braking.

Advantageous embodiments and uses of the present disclosure are explained in greater detail in the following description with partial reference to the Figures.

According to general points of view of the present disclosure, a brake lining is provided for being received in a lining shaft of a disc brake and a brake lining retention device of a disc brake of a motor vehicle. The motor vehicle may be a utility vehicle. The disc brake may be a floating calliper brake.

The brake lining retention device comprises a brake carrier which is fixed at the vehicle side and which has a lining shaft for receiving a brake lining. The lining shaft is delimited at the brake disc leading side in relation to a main rotation direction of the brake disc and delimited at the brake disc trailing side by a lining horn-like member of the brake carrier, respectively.

The brake lining retention device further comprises a brake lining which is guided in the lining shaft and which has a lining retention member and a friction lining which is fixed thereto. The brake lining retention device further comprises a resilient element, that is to say, a spring-like element, which is supported on, that is to say, abuts, a lining horn-like member and a support face of the lining retention member, which face is adjacent to this lining horn-like member.

The lining horn-like members and preferably the bridge portion of the brake carrier connecting them form the lining shaft in which the brake lining is guided. The lining horn-like member is also referred to as a carrier horn-like member. Where applicable, therefore, in the context of the present disclosure the term "carrier horn-like member" is also used in place of the term "lining horn-like member". Both terms are intended to be considered to be equivalent in the context of the present disclosure. The lining horn-like members are preferably each constructed as carriers with a linear support face which is directed towards the brake lining, that is to say, those support faces of the leading-side and trailing-side lining horn-like member are parallel.

The lining retention member is generally constructed as a carrier plate and is also referred to as a lining carrier plate or lining back plate and may further have so-called underlayer intermediate layers. The upper lining side of the friction lining acts as a friction face for tribological cooperation with a friction element, for example, a brake disc.

In this case, the rear carrier horn-like member in a main rotation direction of the brake disc, that is to say, the rotation direction of the brake disc during forward travel of the motor vehicle, is referred to as the leading-side carrier horn-like member. Accordingly, the front carrier horn-like member in a main rotation direction of the brake disc, that is to say, the rotation direction of the brake disc during forward travel of the motor vehicle, is referred to as the trailing-side carrier horn-like member.

A brake lining device according to the present disclosure is further distinguished in that the resilient element is inserted in a recess of the lining retention member. The resilient element can be inserted in the recess so that it projects in the unloaded state beyond the edge of the recess and consequently beyond the support face of the brake lining, which face is adjacent to the lining horn-like member. The recess can be constructed as a pocket or as a groove. The groove may be a longitudinal groove. The resilient element can be inserted in the groove in such a manner that it can expand in the groove longitudinally in the case of loading.

The resilient element affords the advantage that the lining retention member is thereby pressed against the corresponding lining horn-like member of the brake carrier, whereby the play between the lining retention member and the lining shaft is eliminated. The brake lining is thereby prevented from striking in a delayed manner in at least one travel direction and from resulting in damage to the construction at least in the other travel direction, and consequently allows reliable braking. The arrangement of the resilient element in the recess affords the particular advantage that the resilient element cannot be compressed excessively powerfully and consequently always operates in the resilient range.

According to a preferred embodiment, the resilient element is supported on the leading-side lining horn-like member. In other words, the resilient element abuts the leading-side lining horn-like member and the support face of the lining horn-like member, which face is adjacent to the leading-side lining horn-like member. This arrangement ensures that the brake lining does not strike in a delayed manner during a braking operation in the main travel direction, that is to say, during forward travel of the motor vehicle, that the brake lining already abuts the lining horn-like member which trails with respect to the brake disc as a result of the resilient force of the resilient element and is supported at that location.

According to another aspect, the depth of the recess and the resilient element can be constructed so that the resilient element can be introduced completely into the recess in the loaded state. To this end, the depth of the recess must be so great and/or the resilient element must be constructed so that the resilient element can be compressed to such an extent that it no longer projects from the recess. Occurrences of play from zero millimetres can thereby also be reliably eliminated.

Another advantageous variant of the construction according to the present disclosure makes provision for the resilient element to be supported on the lining retention member at least at two locations, for example, two points, and to be supported on the lining horn-like member at only one location, for example, at only one point. Redundancy is thereby avoided and jamming of the brake lining in the lining shaft is prevented.

In order to further reduce the friction in the application direction, the resilient element may advantageously be produced from round material or from a material having an oval cross-section. In this instance, the abutment location with respect to the lining shaft can be located in a rounded portion of the resilient element so that only point-like contact is produced. The resilient element can be produced, for example, from a round steel. Furthermore, the resilient element can be constructed as a wire spring which allows cost-effective and space-saving production.

Another advantageous aspect of the construction according to the present disclosure allows for the resilient element to be secured at a location, for example, retained or fixed, in such a manner that it does not change its position in the case of the brake lining being inserted into the lining shaft. For example, the recess, in which the resilient element is inserted may have at a location a recess, in which an end of the resilient element is inserted and is retained, for example, in a positive-locking manner at that location. That recess may extend perpendicularly or obliquely relative to the base of the recess or extend perpendicularly or obliquely relative to the surface of the friction horn-like member. The end of the resilient element inserted in the recess has a corresponding curvature and/or a bend in order to be able to be inserted in the recess.

According to another aspect, the resilient element can move freely in at least one direction in order to be able to ensure the resilient path in a torsion-free manner.

In order to ensure the strength of the lining retention member, a width of the recess may have at a maximum 50% of the thickness of the lining retention member.

It has already been mentioned above that it is advantageous for the resilient element to abut the lining horn-like member at only one location and therefore to be supported at only one location. In an advantageous variant of the present disclosure, the abutment location of the resilient element on the lining horn-like member, preferably the leading-side lining horn-like member, is eccentric with respect to the simplified force support at the trailing side, that is to say, eccentric with respect to the mean force support of the brake lining on the trailing-side lining horn-like member. This mean force support is intended to be understood to be the resultant friction force of the brake lining on the trailing-side lining horn-like member which typically acts at the average height of the lining horn-like member and the brake lining.

There is thereby produced on the brake lining a defined torque about a Z axis which is parallel with the rotation axis of the brake disc, which torque acts counter to a torque which acts on the brake lining during braking and which attempts to twist the brake lining out of the lining shaft.

Preferably, the abutment location of the resilient element on the lining horn-like member is located radially at a greater radius than the resultant force support of the brake lining on the trailing-side lining horn-like member because in this instance the occurrences of play can be greater as a result of the assembly. In other words, the abutment location of the resilient element on the lining horn-like member can be located in the upper half, preferably in the upper third, of the lining horn-like member. The upper half or the upper third is the one which is located closer to the outer edge of the brake disc.

According to this variant, there is produced on the brake lining a defined torque about a Z axis which is parallel with the rotation axis of the brake disc, which torques produces a support force at the leading side on the carrier horn-like member and consequently stabilises the brake lining in the lining shaft.

According to another aspect of the present disclosure, the brake lining retention device can further have, in a manner known per se, a brake calliper which engages over a brake disc and which is supported on the brake carrier in a floating manner.

According to another aspect of the present disclosure, there is provided a brake lining, in particular a brake lining for being received in a lining shaft of a brake carrier of a brake lining retention device of a disc brake, which carrier is fixed at the vehicle side, wherein the lining shaft is delimited at the brake disc leading side in relation to a main rotation direction of the brake disc and delimited at the brake disc trailing side by a lining horn-like member of the brake carrier, respectively.

The brake lining comprises a lining retention member, for example, in the form of a carrier plate, and a friction lining which is fixed to the lining retention member. According to the present disclosure a lining horn-like member support face of the lining retention member has a recess for receiving a resilient element. The term lining horn-like member support face is intended to be understood to be a lateral outer face of the lining retention member, that is to say, an outer face of the lining retention member, which face is directed towards a lining horn-like member of the lining shaft when the brake lining is guided or retained in the lining shaft.

As already mentioned above, the recess may be a groove. According to another aspect, the brake lining can further comprise a spring which is inserted in the recess.

The resilient element and a depth of the recess can further be constructed in such a manner that the resilient element in the loaded state can be completely introduced into the recess. Furthermore, the resilient element can be produced from a round material or from a material having an oval cross-section. The resilient element may be a wire spring. Furthermore, the recess of the brake lining may have at a location a recess in which an end of the resilient element is inserted and/or is secured in a positive-locking manner.

In order to avoid further repetition, all the features of the brake lining disclosed in connection with the brake lining device are also intended to be considered to be disclosed per se for a device claim with respect to the brake lining and to be able to be claimed.

The present disclosure further relates to a motor vehicle, in particular a utility vehicle, having a brake lining retention device as disclosed in this document.

The above-described embodiments and features of the disclosure are able to be freely combined with each other. Other details and advantages of the disclosure are described below with reference to the appended drawings, in which:

DETAILED DESCRIPTION

In the following description of the Figures, terms such as top, bottom, left, right, front, rear, etc., relate exclusively to the exemplary depiction selected in the respective Figures and position of the disc brake, the lining carrier plate and the brake carrier. Those terms are not intended to be understood in a limiting manner, that is to say, these terms may change as a result of different operating positions or the mirror-symmetrical configuration or the like.

Figure 1:
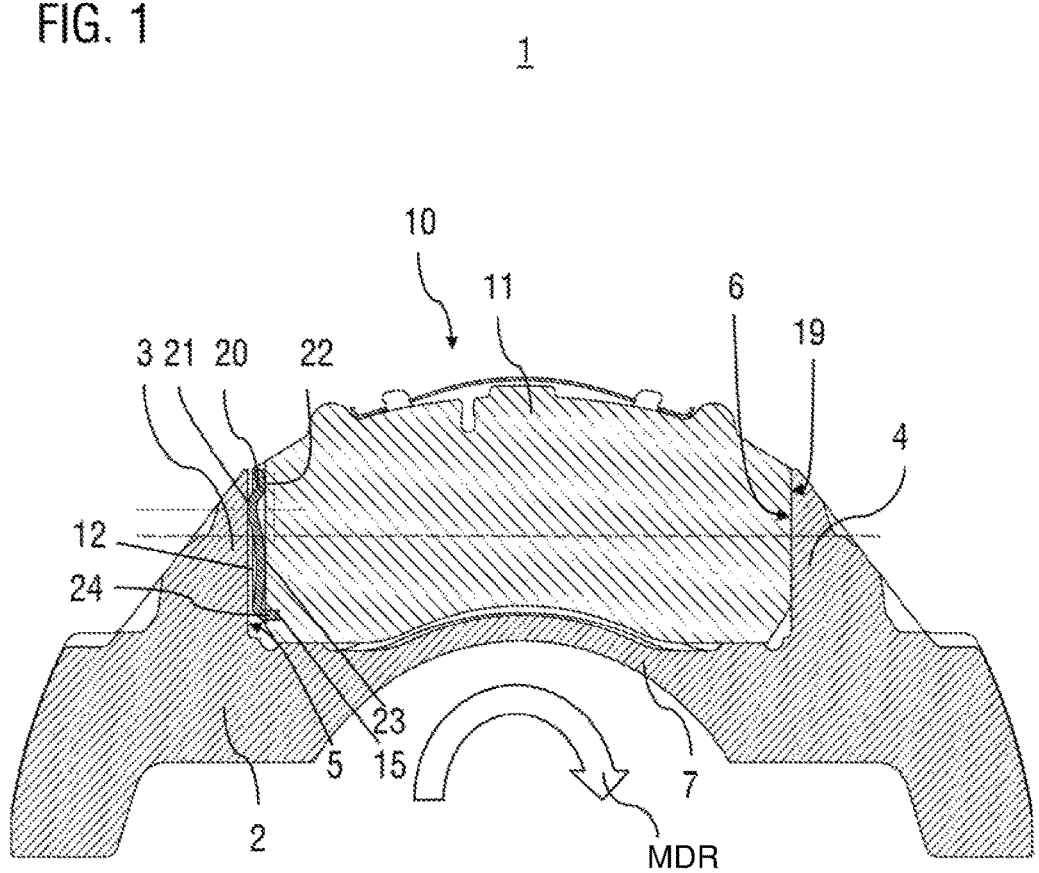
FIG. 1 is a lateral plan cross-sectional view of a brake lining retention device according to an embodiment of the present disclosure.

FIG. 1 is a lateral plan cross-sectional view of a brake lining retention device according to an embodiment of the present disclosure. In this instance, FIG. 1 shows a brake carrier 2, which is known per se, of a disc brake, for example, a floating calliper brake. In this instance, the brake carrier 2 can be constructed as a separate component, as shown here, or as an integral component of a brake calliper. In order to fix the brake carrier 2 to a vehicle axle, it is generally provided with holes, in which screws or bolts can be introduced and retain the brake carrier on the vehicle axle.

In this instance, a lining carrier plate which is known per se (also referred to as a lining back plate) of a brake lining 10 is designated 11, of which only the lining carrier plate 11 can be seen in FIG. 1 and at the rear side (which cannot be seen in FIG. 2) of which a friction lining 17 (which can be seen in FIG. 3) is fixed. In order to receive friction particles which are produced during braking operation at the friction face, a thin groove 18 can be formed in the friction lining 17. The brake carrier 2 is constructed with respective leading-side and trailing-side lining horn-like members 3, 4 which support the lining carrier plate 11. The lining horn-like members 3 and 4 and the bridge portion 7 which connects them form the lining shaft in which the brake lining 10 is guided.

The carrier horn-like member 3 constitutes in this case the leading-side lining horn-like member 3 because it is the rear lining horn-like member in the main rotation direction MRD of the brake disc, that is to say, the rotation direction of the brake disc during forward travel of the motor vehicle. The lining horn-like horn-like member 4 is accordingly the trailing-side lining horn-like member. The lining horn-like members 3, 4 are each constructed as carriers with a linear support face 5, 6 which is directed towards the brake lining, that is to say, those support faces 5, 6 of the leading-side and trailing-side lining horn-like member are parallel. The lining horn-like member support faces 19 of the lining carrier plate are adjacent to those support faces 5, 6, that is to say, the lateral outer faces of the lining carrier plate 11, with which the lining carrier plate 11 can be supported on the support faces 5, 6 of the lining horn-like members 3, 4 when the lining carrier plate has been introduced into the lining shaft.

A recess which is in the form of a groove 12 and in which a resilient element 20, in this instance a wire spring comprising ring steel, is formed in the lining back plate 11 in one of the lining horn-like member support faces 19. The recess is formed in the leading-side lining horn-like member support face, whereby the lining back plate 11 is pressed against the leading-side lining horn-like member 3 of the brake carrier 2 at the trailing side of the brake disc. In this case, the resilient element 20 can be completely introduced into the groove 12 and therefore eliminate occurrences of play from zero millimetres. In the non-compressed state of the resilient element, the resilient element projects from the groove 12 and thereby projects beyond the groove walls 13.

The resilient element (spring-like element) 20 is supported in this instance in the lining back plate 11 at two locations 22 and 23, that is to say, the resilient element 20 is positioned at the two locations 22 and 23 on the groove base 14. However, the resilient element 20 is in contact with the lining shaft or the leading-side lining horn-like member 3 only one location 21. Redundancy and jamming of the brake lining 10 in the lining shaft are thereby prevented. In this case, the abutment location 21 on the lining shaft is located in a rounded portion of the resilient element 20 in order to reduce contact friction.

Furthermore, the abutment location 21 is advantageously located eccentrically with respect to the simplified force support at the trailing side and in the shown embodiment radially further at a greater radius because in this instance the occurrences of play may be greater as a result of the assembly.

Figure 2:
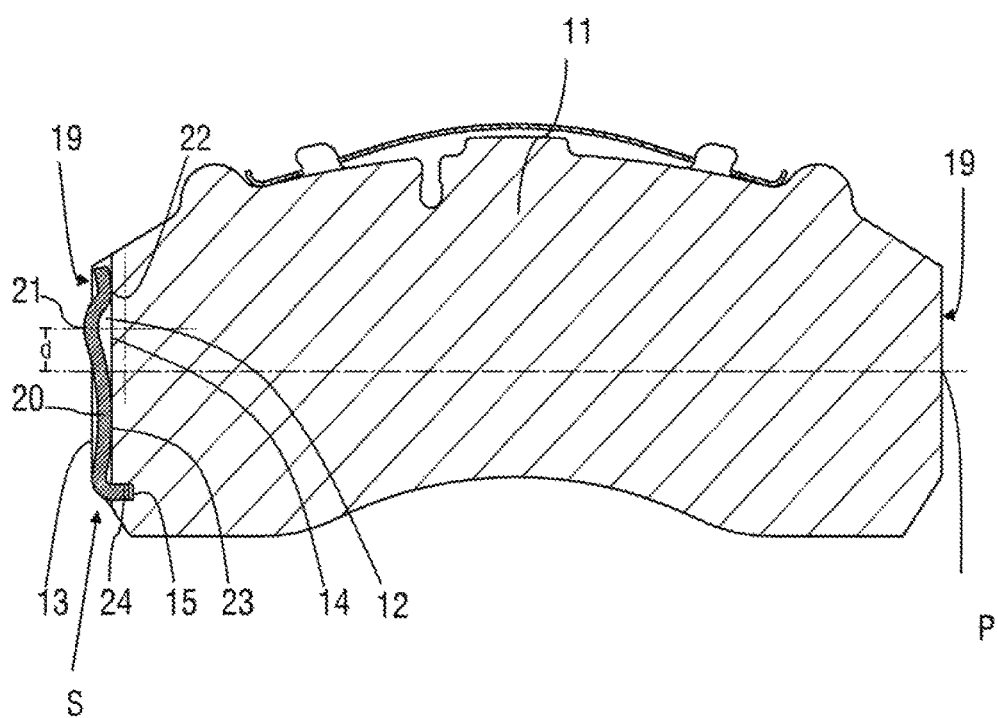
FIG. 2 is a lateral plan cross-sectional view of a brake lining retention member with a resilient element according to an embodiment of the present disclosure.
Figure 3:
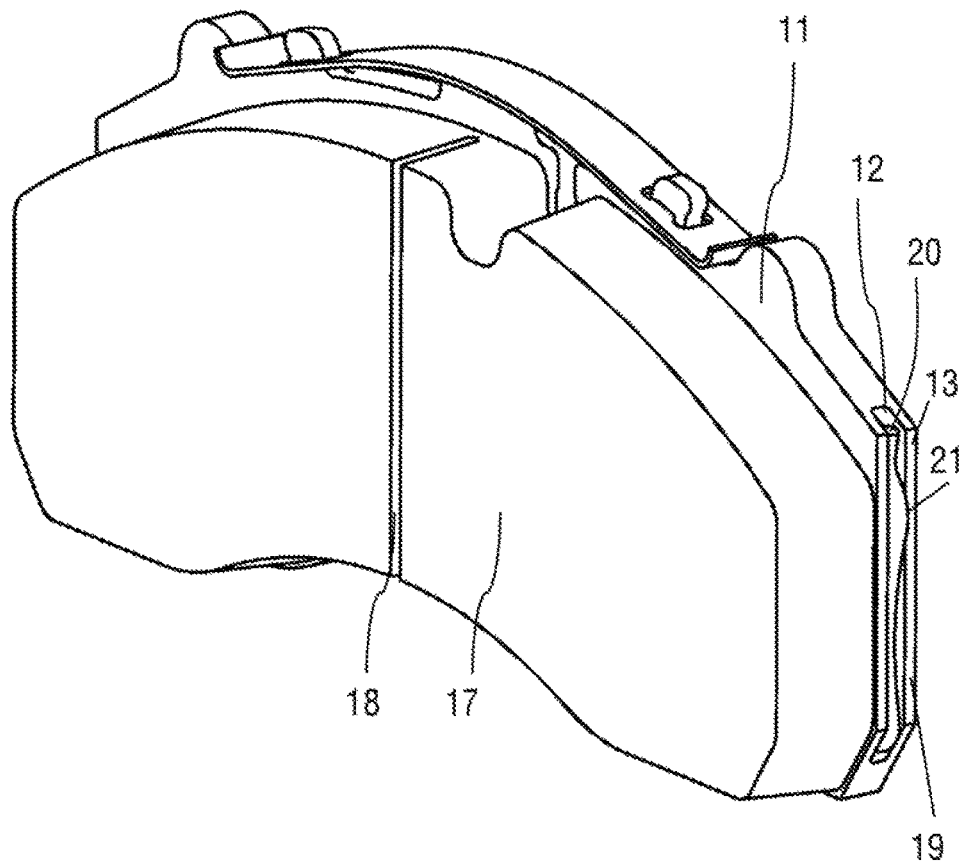
FIG. 3 is a perspective view of the brake lining retention member from FIG. 2.
Figure 4:
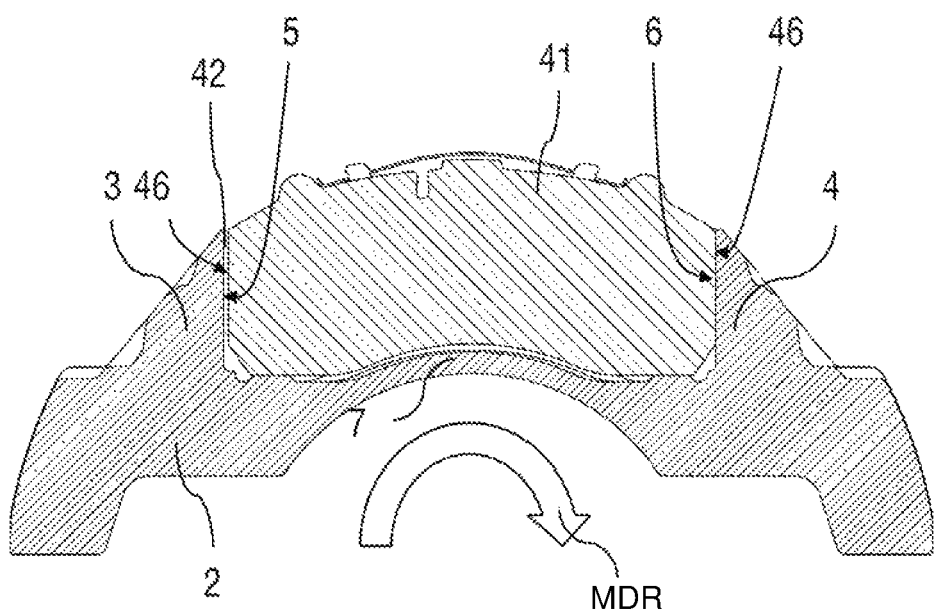
FIG. 4 is a lateral plan cross-sectional view of a brake lining retention device known from the prior art.

This can better be seen in FIG. 2 which is an enlarged lateral plan cross-sectional view of the brake lining retention member 10 with a resilient element 20 from FIG. 1.

The resultant force vector of the mean force support at the trailing side acts at the point P, through which the dot-dash horizontal line extends. The abutment location 21 on the leading-side lining horn-like member 3 is located at the trailing side in a state eccentric relative thereto with the spacing d from the resultant force vector of the mean force support. The location 21 is located in relation to the resultant force vector of the mean force support at the trailing side above this force vector, that is to say, radially at a greater radius and therefore nearer the outer peripheral side of the brake disc (not shown).

The resilient element 20 is in this instance fixed at least at one location in such a manner that it does not change its position during insertion of the brake lining 10 into the lining shaft and can move freely in at least one direction in order to ensure the resilient path in a torsion-free manner. To this end, in this instance a recess 15 is formed in a lower end region S of the groove 12 and an end 24 of the resilient element is inserted therein in order to form a positive-locking retention member, which end 24 is curved in a hook-like manner.

Although the present disclosure has been described with reference to specific embodiments, it is evident to a person skilled in the art that different changes can be carried out and equivalents can be used as replacements without departing from the scope of the present disclosure. Furthermore, many modifications can be carried out without leaving the associated scope. Consequently, the present disclosure is not intended to be limited to the disclosed embodiments but instead is intended to include all the embodiments which fall within the scope of the appended patent claims.

LIST OF REFERENCE NUMERALS

1 Brake lining retention device
2 Brake carrier
3 Leading-side lining horn-like member
4 Trailing-side lining horn-like member
5 Support face of the leading-side lining horn-like member
6 Support face of the trailing-side lining horn-like member
7 Bridge portion
10 Brake lining
11 Lining retention member, for example, lining carrier plate
12 Recess, for example, groove
13 Groove wall
14 Groove base
15 Recess
17 Friction lining
18 Groove
19 Support face of the lining retention member (lining horn-like member support face)
20 Resilient element, for example, wire spring
21 Support location on lining horn-like member
22, 23 Support location on lining retention member
24 Curved end of the resilient element
40 Brake lining retention device
41 Lining retention member, for example, lining carrier plate
42 Play
46 Support face
MRD Main rotation direction
P Trailing-side mean force support location
S Fixing location

We claim:

1. A brake lining retention device of a disc brake comprising:
    a brake carrier which is fixed at a vehicle and which has a lining recess, wherein the lining recess is delimited by a leading side of a horn-shaped lining member in relation to a main rotation direction (MRD) of the brake disc and delimited by a trailing side of the horn-shaped lining member of the brake carrier;
    a brake lining which is guided in the lining recess and which has a lining retention member and a friction lining which is fixed thereto; and
    a resilient element which is inserted in a recess of the lining retention member and which is supported on the leading side of the horn-shaped lining member and a support face of the lining retention member, which face is adjacent to the leading side of the horn-shaped lining member,
    wherein the resilient element is supported on the horn-shaped lining member at only one location and is supported on the lining retention member at least at two locations, and
    wherein the only one location where the resilient element is supported on the leading side of the horn-shaped lining member is located in an upper half of the horn-shaped lining member.

2. The brake lining retention device according to claim 1, wherein a depth of the recess and the resilient element are constructed so that the resilient element can be introduced completely into the recess in a loaded state.

3. The brake lining retention device according to claim 1, wherein the recess is a groove, in particular a longitudinal groove.

4. The brake lining retention device according to claim 1, wherein the resilient element is secured at a location in such a manner that it does not change the location in the case of the brake lining being inserted into the lining recess.

5. The brake lining retention device according to claim 1, wherein the recess has at a location a recess, in which an end of the resilient element is inserted or is retained in a positive-locking manner.

6. The brake lining retention device according to claim 1, wherein a width of the recess has at a maximum 50% of the thickness of the lining retention member.

7. The brake lining retention device according to claim 1, wherein the only one location where the resilient element is supported on the leading side of the horn-shaped lining member is eccentric with respect to a mean force support (friction force) of the brake lining on the trailing side of the horn-shaped lining member.

8. The brake lining retention device according to claim 1, further comprising a brake caliper which engages over a brake disc and which is supported on the brake carrier in a floating manner.

9. The brake lining according to claim 1, further comprising a resilient element which is inserted in the recess.

10. The brake lining according to claim 9, wherein a depth of the recess and the resilient element are constructed in such a manner that the resilient element in a loaded state can be completely introduced into the recess.

11. The brake lining according to claim 9, wherein the resilient element is produced from a material having a round or oval cross section.

12. The brake lining according to claim 9, wherein the recess has at a location a recess in which an end of the resilient element is inserted and/or is secured in a positive-locking manner.

13. The brake lining retention device according to claim 1, wherein the only one location where the resilient element is supported on the leading side of the horn-shaped lining member is located in an upper third of the horn-shaped lining member.

14. A motor vehicle, in particular a utility vehicle, comprising
a brake lining retention device for a disc brake including,
a brake carrier which is fixed at a vehicle and which has a lining recess, wherein the lining recess is delimited by a leading side of a horn-shaped lining member in relation to a main rotation direction (MRD) of the brake disc and delimited by a trailing side of the horn-shaped lining member of the brake carrier;
a brake lining which is guided in the lining recess and which has a lining retention member and a friction lining which is fixed thereto;
a resilient element which is inserted in a recess of the lining retention member and which is supported on the horn-shaped lining member and a support face of the lining retention member, which face is adjacent to the horn-shaped lining member, wherein the resilient element is inserted in a recess of the lining retention member,
wherein the resilient element is supported on the horn-shaped lining member at only one location and is supported on the lining retention member at least at two locations; and
wherein the only one location where the resilient element is supported on the leading side of the horn-shaped lining member is located in an upper half of the horn-shaped lining member.

\* \* \* \* \*